(12) United States Patent
Long

(10) Patent No.: US 8,908,260 B2
(45) Date of Patent: Dec. 9, 2014

(54) FOCUSING MECHANISM

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 112 days.

(21) Appl. No.: 13/443,249

(22) Filed: Apr. 10, 2012

(65) Prior Publication Data

US 2013/0100521 A1   Apr. 25, 2013

(30) Foreign Application Priority Data

Oct. 19, 2011   (CN) .......................... 2011 1 0318186

(51) Int. Cl.
| | | |
|---|---|---|
| *G02F 1/29* | (2006.01) | |
| *G02B 15/14* | (2006.01) | |
| *G02B 7/02* | (2006.01) | |
| *G03B 17/00* | (2006.01) | |
| *G03B 3/10* | (2006.01) | |
| *G02B 7/08* | (2006.01) | |

(52) U.S. Cl.
CPC ... *G03B 3/10* (2013.01); *G02B 7/08* (2013.01)
USPC ............. 359/319; 359/694; 359/823; 396/72; 396/79

(58) Field of Classification Search
USPC ......... 359/808, 811, 815, 819, 822–824, 237, 359/319, 462, 665, 666, 691, 694.696, 699, 359/700, 716, 803; 396/72, 79, 85, 133, 83, 396/132; 348/211.9, 211.11, 211.12, 230.1, 348/240.99, 240.1, 240.2, 240.3
See application file for complete search history.

(56) References Cited

U.S. PATENT DOCUMENTS

| | | | |
|---|---|---|---|
| 2002/0154278 A1* | 10/2002 | Masuda ........................ | 353/101 |
| 2002/0163741 A1* | 11/2002 | Shibazaki ..................... | 359/819 |
| 2004/0126198 A1 | 7/2004 | Chen | |
| 2011/0120254 A1 | 5/2011 | Zhang et al. | |

FOREIGN PATENT DOCUMENTS

| | | |
|---|---|---|
| TW | 201121735 | 7/2011 |
| WO | WO2004004986 | 1/2004 |

* cited by examiner

*Primary Examiner* — Thomas K Pham
*Assistant Examiner* — Brandi Thomas
(74) *Attorney, Agent, or Firm* — Novak Druce Connolly Bove + Quigg LLP

(57) ABSTRACT

A focusing mechanism for focusing a lens module includes a base seat, a movable platform, a positioning assembly, a support bracket and a plurality of arms. The positioning assembly is fixed to the base seat and passes through a center of the movable platform, a lens of the lens module is detachably mounted on the positioning assembly. The support bracket is fixed to the movable platform. A sensor of the lens module is detachably mounted on the support bracket. Each of the plurality of arms rotatably interconnects the movable platform and the base seat, the movable platform drives the support bracket to rotate relative to the positioning assembly to enable the lens to rotate relative to the sensor via a drive of the arms.

15 Claims, 5 Drawing Sheets

FOCUSING MECHANISM

BACKGROUND

1. Technical Field

The present disclosure relates to focusing mechanisms, and more particularly, to a focusing mechanism with multiple degrees of movement.

2. Description of Related Art

Multi function electronic devices are more and more popularly, in order to take photos or videos, an electronic device needs to be equipped with a lens module. The lens module includes a lens and a sensor. In assembling, a focusing mechanism is employed to adjust the distance between the lens and the sensor to enable a focal area of the lens aligned to a sensing area of the sensor. The focusing mechanism includes an adjusting assembly and a positioning assembly which are separated from each other. The adjusting assembly includes three driving subassemblies and a support bracket driven by the three driving subassemblies. The sensor is fixed to the positioning assembly, the lens is fixed to the support bracket. The support bracket drives the lens to move relative to the sensor to adjust the distance between the lens and the sensor. When the lens is aligned with the sensor, the lens and the sensor are fixed to the electronic device and detached from the focusing mechanism, thus the assembling of the lens module is accomplished. However, the lens moves along three directions via the three driving subassemblies, that decreasing the speed and degrees of movement of the focusing mechanism, and the assembling of the lens module is not accurate.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
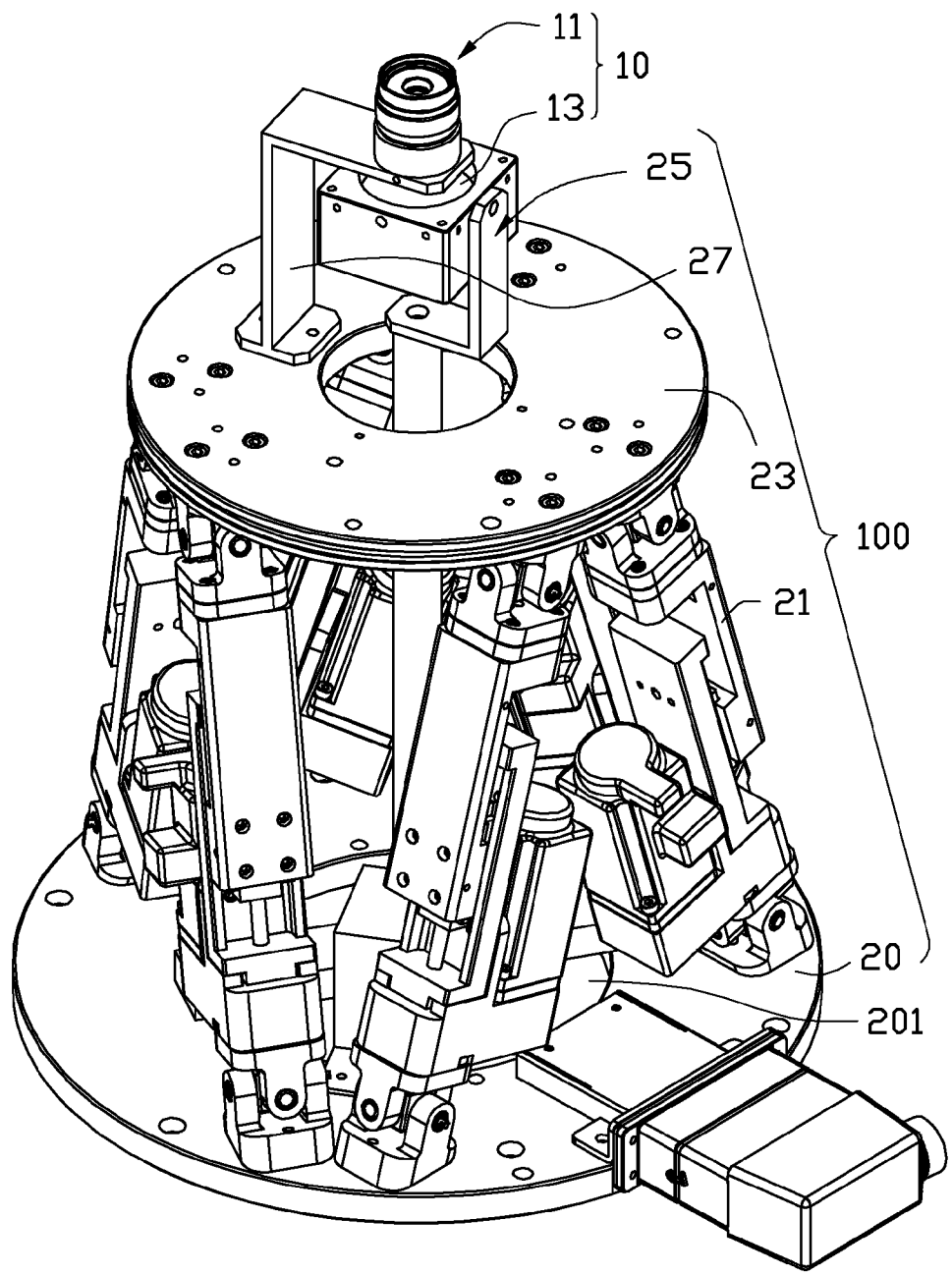
FIG. 1 is an isometric view of an embodiment of a focusing mechanism and a lens module, the focusing mechanism including a plurality of arms.

Referring to FIG. 1, an embodiment of a focusing mechanism 100 is employed to focus a lens module 10. The lens module 10 includes a lens 11 and a sensor 13 which are separated from each other. The focusing mechanism 100 includes a base seat 20, a plurality of arms 21, a movable platform 23, a positioning assembly 25 and a support bracket 27. Each of the plurality of arms 21 rotatably interconnects the base seat 20 and the movable platform 23. The support bracket 27 is fixed to the movable platform 23. The lens 11 is mounted on the support bracket 27. The positioning assembly 25 is fixed to the base seat 20 and passing through a center of the movable platform 23. The sensor 13 is mounted on the positioning assembly 25. The movable platform 23 rotates along multi-directions and driving the lens 11 to move via the support bracket 27, thus the lens 11 is capable of moving relative to the sensor 13. In the embodiment, the lens module 10 can be employed in a mobile phone. The sensor 13 is a photoreception chip.

Figure 5:
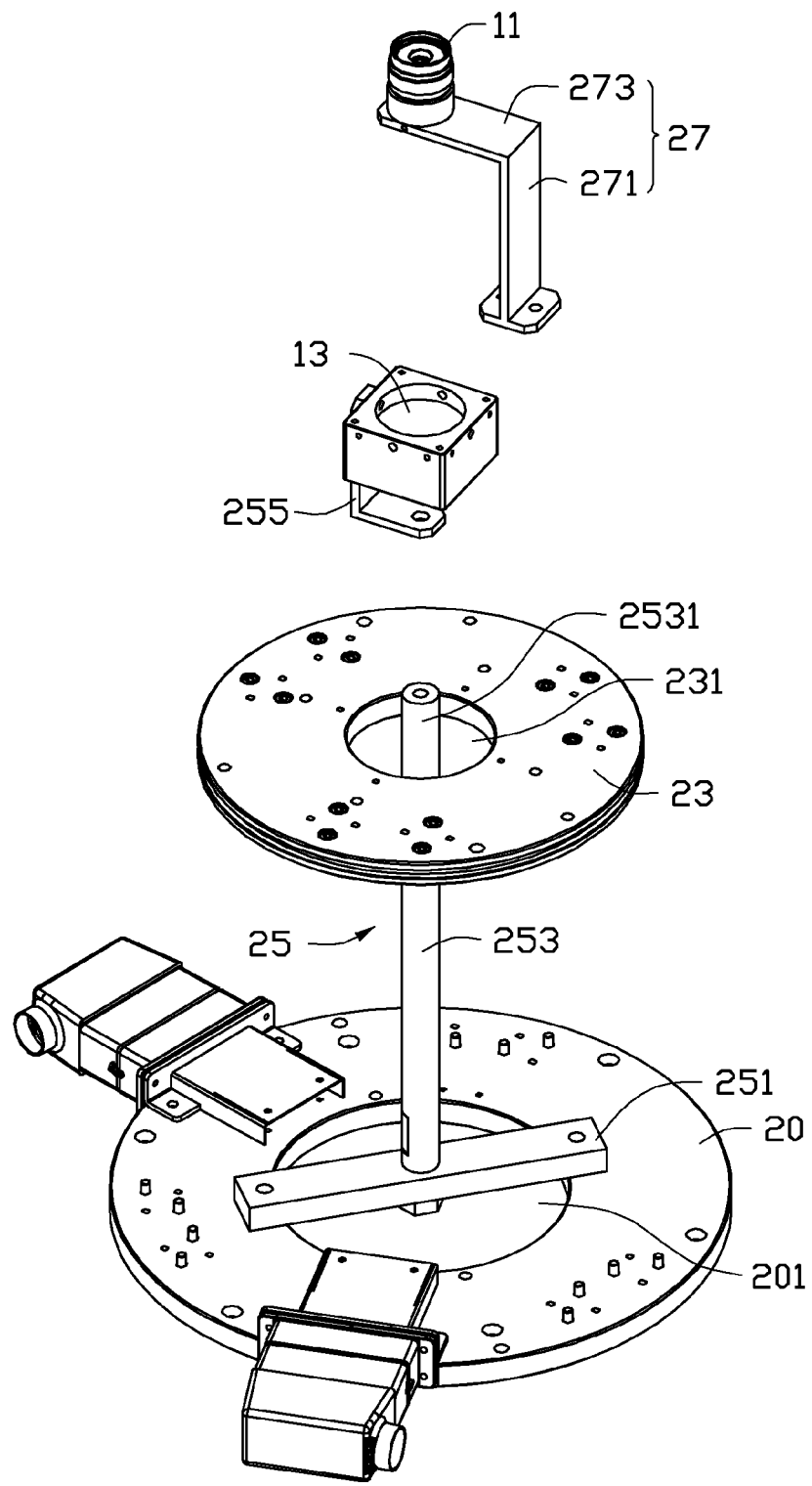
FIG. 5 is an exploded, isometric view of a portion of the focusing mechanism with the lens module of FIG. 1.

Referring to FIG. 5, the base seat 20 is an annular platform and defines a first through hole 201 in a middle portion thereof.

Figure 2:
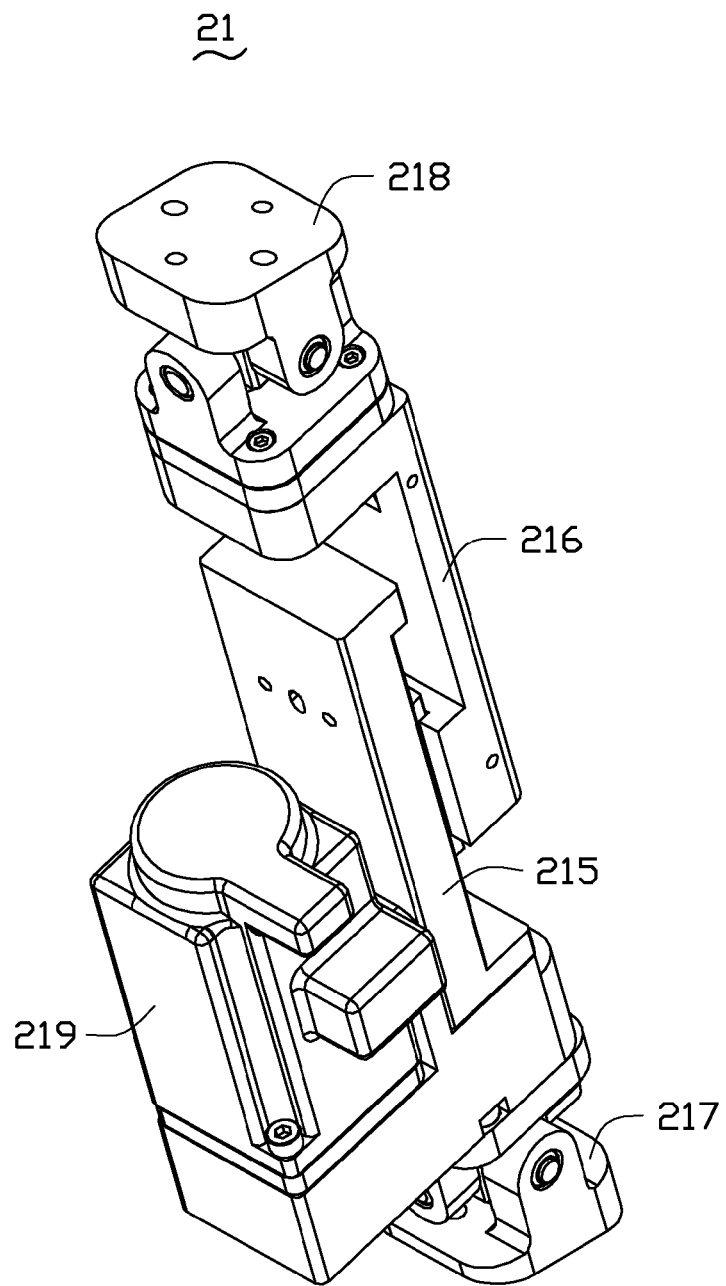
FIG. 2 is an isometric view of one of the arms of the focusing mechanism of FIG. 1.

Also referring to FIG. 2, each of the arms 21 includes a first support member 215, a second support member 216, a first connecting member 217, a second connecting member 218 and a driving assembly 219. The first support member 215 is slidably connected to the second support member 216 and rotatably connected to the base seat 20 via the first connecting member 217. The second support member 216 is rotatably connected to the movable platform 23 via the second connecting member 218. The driving assembly 219 is mounted on the first support member 215 and drives the second support member 216 slide relative to the first support member 215.

Figure 3:
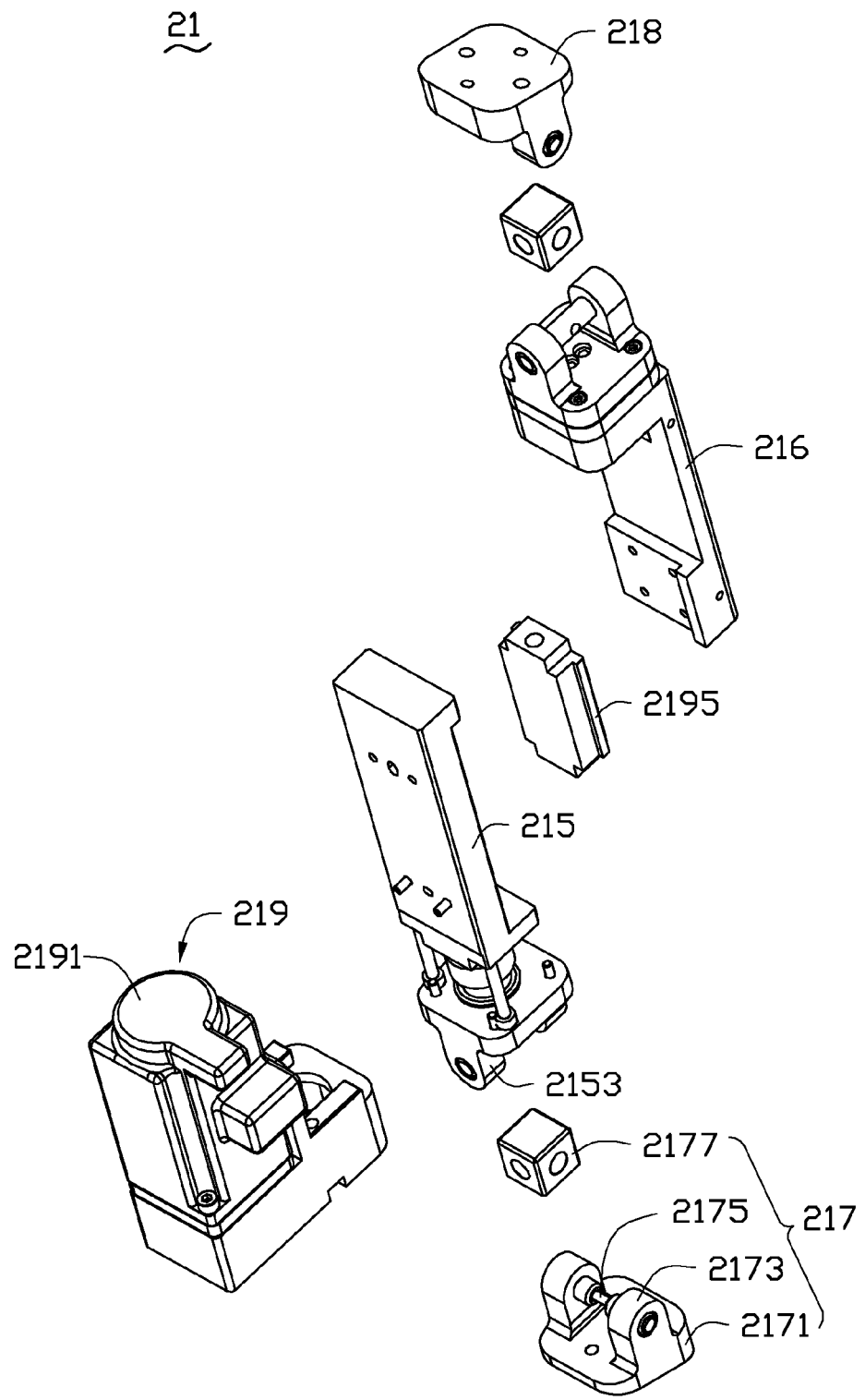
FIG. 3 is an exploded, isometric view of the arm of the FIG. 2.
Figure 4:
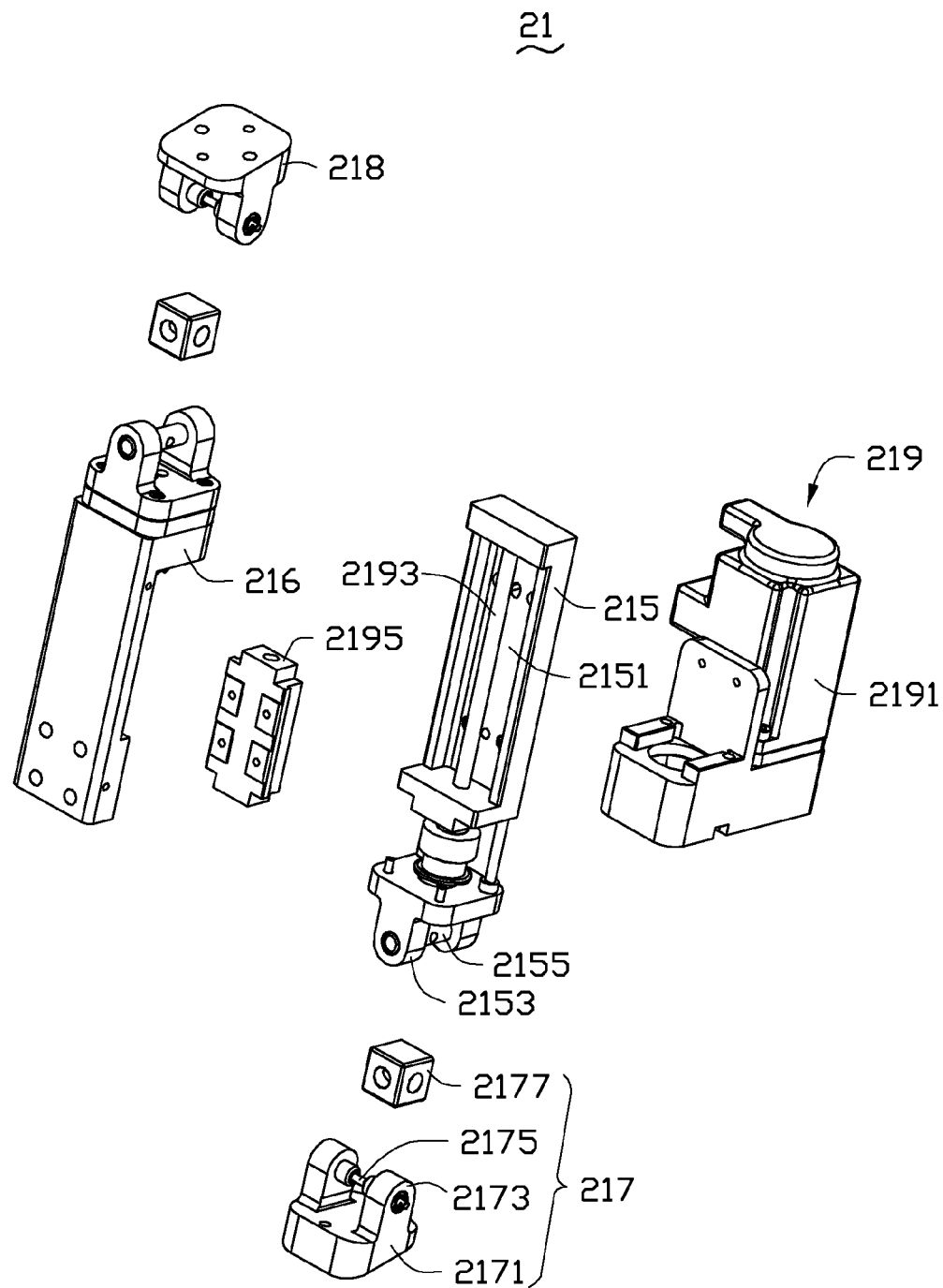
FIG. 4 is similar to FIG. 3, but viewed from another aspect.

Also referring to FIGS. 3 and 4, the first support member 215 is in a substantially rectangular shape and defines a guiding groove 2151 along a longitudinal direction of the first support member 215. The first support member 215 includes a pair of first pivotal portions 2153 at an end and a first pivotal shaft 2155 interconnecting the pair of first pivotal portions 2153.

The second support member 216 has a structure similar to the first support member 215 except that the second support member 216 has no guiding groove. The second support member 216 is partially laminated on the first support member 215 and slides along the first support member 215.

The first connecting member 217 interconnects the base seat 20 and the first support member 215. The first connecting member 217 includes a main body 2171 and a pair of pivotal portions 2173 extending from an end of the main body 2171. The first connecting member 217 further includes a second pivotal shaft 2175 connecting with the two pivotal portions 2173, and a rotation block 2177 rotatably sleeved on the second pivotal shaft 2175. The first pivotal shaft 2155 of the first support member 215 rotatably extends through the rotation block 2177 and is perpendicular to the second pivotal shaft 2175.

The second connecting member 218 has a structure the same as the first connecting member 217 and interconnects the movable platform 23 and the second support member 216.

The driving assembly 219 is mounted on an end portion of the first support member 215 adjacent to the first pivotal portions 2153. The driving assembly 219 includes a driver 2191, a lead screw 2193 driven by the driver 2191 and a movable block 2195 sleeved on the lead screw 2193. The driver 2191 is positioned at a side of the first support member 215; the lead screw 2193 is positioned at an opposite side of the support member 215 and is received in the guiding groove 2151. The movable block 2195 is fixed to the second support member 216 and engages with the lead screw 2193. The movable block 2195 is driven by the lead screw 2193 and drives the second support member 216 to move relative to the first support member 215.

The movable platform 23 is circular and arranged parallel to the base seat 20. A diameter of the movable platform 23 is less than that of the base seat 20. The movable platform 23 defines a second through hole 231 corresponding to the first through hole 201 at a middle portion thereof.

In the illustrated embodiment, the number of arms 21 is six. The movable platform 23 rotates relative to the base seat 20 in movements of six degrees, the six arms 21 have three positioning relationships as follows:

(1) The six first connecting members 217 connected to the base seat 20 are divided into three groups. Each group includes two first connecting members 217 positioned adjacently. The three groups of first connecting members 217 are positioned in trisection portions of a circular periphery of the base seat 20;

(2) The six second connecting members 218 connected to the movable platform 23 are divided into three groups. Each group includes two second connecting members 218 positioned adjacently. The three groups of second connecting members 218 are positioned in trisection portions of a circular periphery of the movable platform 23;

(3) Orthographic projections of the three groups of the second connecting members 218 on the base seat 20 are staggered with the three groups of the first connecting members 217. The orthographic projections of the three groups of the second connecting members 218 and the three groups of the first connecting members 217 divide the base seat 20 to six equal portions along a circumference direction of the base seat 20.

Referring to FIG. 5, the positioning assembly 25 is connected to the base seat 20 and extends through the second through hole 213. In the illustrated embodiment, the positioning assembly 25 includes a bottom plate 251 mounted on the base seat 20, a support rod 253 perpendicularly mounted on the bottom plate 251 and a support plate 255 fixed to an end of the support rod 253 away form the bottom plate 251. The bottom plate 251 and the support rod 253 cooperatively define a "T" shape. The bottom plate 251 is a rectangular strip and positioned above and across the first through hole 201. The support rod 253 is fixed on the bottom plate 251 and includes a mounting potion 2531 at an end distal of the bottom plate 251. The mounting portion 2531 is a rod shape and extends through the second through hole 231. The support plate 255 is an "L" shape, an end of the support plate 255 is perpendicularly mounted on the mounting portion 2531, an opposite end of the support plate 255 extends parallel to the support rod 253.

The support bracket 27 includes a connecting portion 271 and a support portion 273 perpendicularly to the connecting portion 271. The connecting portion 271 is perpendicularly connected to the movable platform 23, the support portion 273 is arranged parallel to the movable platform 23 and is located above the second through hole 231. In this embodiment, the support bracket 27 is L-shaped.

Referring to FIGS. 1 through 5 again, in assembly, the lead screw 2193 is received in the guiding groove 2151 of the first support member 215. The driver 2191 is mounted on the first support member 215 and connected to the lead screw 2193. The movable block 2195 is sleeved on and engages with the lead screw 2193. The second support member 216 is fixed to the movable block 2195 and partially laminated on the first support member 215. The first pivotal shaft 2155 is rotatably inserted into the rotation block 2177 of the first connecting member 217. The main body 2171 of the first connecting member 217 is fixed to the base seat 20. The second connecting member 218 is rotatably connected to the second support member 216 and fixed to the movable platform 23. Therefore, assembly of the arm 21 with the base seat 20 and the movable platform 23 is completed. The other five arms 21 are mounted on the base seat 20 and the movable platform 23 in the same way.

The connecting portion 271 of the support bracket 27 is perpendicularly fixed to the movable platform 23, the support portion 273 is perpendicular to the movable platform 23. The bottom plate 251 is fixed to the base seat 20 and positioned above and across the first through hole 201, the support rod 253 is fixed on the bottom plate 251. An end of the support plate 255 is fixed to the mounting portion 2531 of the support rod 253, an opposite end of the support plate 255 is located above the second through hole 231 and below the support portion 273 of the support bracket 27.

In use, the lens 11 is fixed on the support bracket 27 and the sensor 13 is fixed on the support plate 255. The driving assemblies 219 drive corresponding arms 21 to enable the second support members 216 move relative to the first support members 215, the movable platform 23 rotates in six degrees of freedom and terminates at the limitation of the first connecting members 217 and the second connecting members 218. The movable platform 23 drives the lens 11 to move with respect to the sensor 13 via the support bracket 27. When the lens 11 is aligned to the sensor 13, the lens 11 and the sensor 13 are fixed to an electronic device and detached from the focusing mechanism 100.

The focusing mechanism 100 includes six arms 21 and is capable of rotating in a movement of six degrees via the six arms 21. In use, the lens 11 is driven by the focusing mechanism 100 to rotate relative to the sensor 13 in a movement of six degrees, thus improving the accuracy of the focusing process. Moreover, the arms 21 stretch and withdraw in a longitudinal direction, which is space saving.

The number of plurality of arms 21 may be changed when needed.

The first support member 215 may be rotatably connected to the base seat 20, and the second support member 216 may be rotatably connected to the movable platform 23, such that the first connecting member 217 and the second connecting member 218 may be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A focusing mechanism for focusing a lens module, comprising:
   a base seat;
   a movable platform
   a positioning assembly fixed to the base seat and passing through a substantially center of the movable platform, the positioning assembly being for a lens of the lens module detachably mounting thereon;
   a support bracket fixed to the movable platform, the support bracket being for a sensor of the lens module detachably mounting thereon; and
   a plurality of arms, each of the plurality of arms rotatably interconnecting the movable platform and the base seat;
   wherein each of the plurality of arms comprises a first support member, a second support member, a first connecting member, and a second connecting member; the first support member is slidably connected to the second support member and rotatably connected to the base seat via the first connecting member, and the second support member is rotatably connected to the movable platform via the second connecting member; the plurality of arms comprise six arms, and the six arms have two positioning relationships as follows:
   (1) The six first connecting members are divided into three groups, each group comprises two first connecting members positioned adjacently, and the three groups of first connecting members are positioned in trisection portions of a circular periphery of the base seat;
   (2) The six second connecting members are divided into three groups, each group comprises two second connecting members positioned adjacently, the three groups of second connecting members are positioned in trisection portions of a circular periphery of the movable platform;

(3) Orthographic projections of the three groups of the second connecting members on the base seat are staggered with the three groups of the first connecting members, and the orthographic projections of the three groups of the second connecting members and the three groups of the first connecting members divide the base seat to six equal portions along a circumference direction of the base seat; the movable platform drives the support bracket rotate relative to the positioning assembly to enable the lens to rotate relative to the sensor via the arms when the focusing mechanism is in use.

2. The focusing mechanism of claim 1, wherein the base seat is annular and defines a first through hole in the middle portion thereof, the movable platform is annular and defines a second through hole in the middle portion thereof corresponding to the first through hole, a diameter of the movable platform is less than that of the base seat, and the positioning assembly is located above the first through hole and extends through the second through hole.

3. The focusing mechanism of claim 2, wherein the positioning assembly comprises a bottom plate, a support rod and a support plate, the bottom plate is mounted on the base seat, the support rod is perpendicularly fixed to the bottom plate and comprises a mounting potion at an end distant form the bottom plate, the mounting portion extends through the second through hole, and the support plate is mounted on the mounting portion.

4. The focusing mechanism of claim 1, wherein each of the plurality of arms further comprises a driving assembly, the driving assembly comprises a driver, a lead screw and a movable block, the driver is positioned at a side of the first support member, the lead screw is positioned at an opposite side of the support member and driven by the driver, the movable block is fixed to the second support member and engages with the lead screw, and the movable block is driven by the lead screw and capable of driving the second support member move relative to the first support member.

5. The focusing mechanism of claim 3, wherein the support plate has an end perpendicularly mounted on the mounting portion of the support rod and an opposite end extending parallel to the support rod.

6. The focusing mechanism of claim 5, wherein the support bracket comprises a connecting portion and a support portion perpendicularly to the connecting portion, the connecting portion is perpendicularly connected to the movable platform, and the support portion is arranged parallel to the movable platform and located above the movable platform.

7. The focusing mechanism of claim 1, wherein the first support member comprises a pair of first pivotal portions at an end and a first pivotal shaft interconnecting the pair of first pivotal portions, the first connecting member comprises a main body, a pair of pivotal portions, a second pivotal shaft and a rotation block, the pair of the pivotal portions extend from an end of the main body, the second pivotal shaft interconnects the two pivotal portions, the rotation block is rotatably sleeved on the second pivotal shaft, and the first pivotal shaft rotatably extends through the rotation block to enable the first support member rotate relative to the first connecting member.

8. The focusing mechanism of claim 7, wherein first pivotal shaft of the first support member is perpendicular to the second pivotal shaft of the first connecting member.

9. The focusing mechanism of claim 1, wherein the arms drive the movable platform rotate in a movement of multi-degrees when the focusing mechanism is in use.

10. A focusing mechanism, comprising:
a base seat;
a movable platform arranged parallel to the base seat,
a positioning assembly comprising a support rod, the support rod being fixed to the base seat and passing through a substantially center of the movable platform;
a support bracket fixed to the movable platform; and
a plurality of arms, each of the plurality of arms rotatably interconnecting with the movable platform and the base seat,
wherein each of the plurality of arms comprises a first support member, a second support member, a first connecting member and a second connecting member, the first support member is slidably connected to the second support member and rotatably connected to the base seat via the first connecting member, and the second support member is rotatably connected to the movable platform via the second connecting member, the plurality of arms comprise six arms, and the six arms have two positioning relationships as follows:

(1) The six first connecting members are divided into three groups, each group comprises two first connecting members positioned adjacently, and the three groups of first connecting members are positioned in trisection portions of a circular periphery of the base seat;

(2) The six second connecting members are divided into three groups, each group comprises two second connecting members positioned adjacently, the three groups of second connecting members are positioned in trisection portions of a circular periphery of the movable platform;

(3) Orthographic projections of the three groups of the second connecting members on the base seat are staggered with the three groups of the first connecting members, and the orthographic projections of the three groups of the second connecting members and the three groups of the first connecting members divide the base seat to six equal portions along a circumference direction of the base seat; the movable platform is capable of driving the support bracket to rotate relative to the support rod via a drive of the arms.

11. The focusing mechanism of claim 10, wherein the base seat is annular and defines a first through hole in the middle portion thereof, the movable platform is annular and defines a second through hole in the middle portion thereof corresponding to the first through hole, a diameter of the movable platform is less than that of the base seat, and the positioning assembly is located above the first through hole and extends through the second through hole.

12. The focusing mechanism of claim 11, wherein the positioning assembly further comprises a bottom plate and a support plate, the bottom plate is mounted on the base seat, the support rod is perpendicularly fixed to the bottom plate and comprises a mounting potion at an end distant form the bottom plate, the mounting portion extends through the second through hole, and the support plate is mounted on the mounting portion.

13. The focusing mechanism of claim 10, wherein each of the plurality of arms further comprises a driving assembly, the driving assembly comprises a driver, a lead screw and a movable block, the driver is positioned at a side of the first support member, the lead screw is positioned at an opposite side of the support member and driven by the driver, the movable block is fixed to the second support member and engages with the lead screw, and the movable block is driven by the lead screw and capable of driving the second support member to move relative to the first support member.

14. The focusing mechanism of claim 10, wherein the first support member comprises a pair of first pivotal portions at an end and a first pivotal shaft interconnecting the pair of first pivotal portions, the first connecting member comprises a main body, a pair of pivotal portions, a second pivotal shaft and a rotation block, the pair of the pivotal portions extend from an end of the main body, the second pivotal shaft interconnects the pair of pivotal portions, the rotation block is rotatably sleeved on the pivotal shaft, the first pivotal shaft of the first support member rotatably extends through the rotation block and is perpendicular to the first pivotal shaft.

15. The focusing mechanism of claim 10, wherein the movable platform rotates in a movement of multi-degrees via the drive of the arms.

\* \* \* \* \*